United States Patent
He et al.

(10) Patent No.: US 11,182,585 B2
(45) Date of Patent: Nov. 23, 2021

(54) UNDER-SCREEN OPTICAL FINGERPRINT IDENTIFICATION DEVICE AND ELECTRONIC APPARATUS

(71) Applicant: SHENZHEN GOODIX TECHNOLOGY CO., LTD., Shenzhen (CN)

(72) Inventors: Yi He, Shenzhen (CN); Ke Li, Shenzhen (CN); Peng Jiang, Shenzhen (CN); Haixiang Wang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 88 days.

(21) Appl. No.: 16/667,905

(22) Filed: Oct. 30, 2019

(65) Prior Publication Data

US 2020/0065550 A1 Feb. 27, 2020

Related U.S. Application Data

(63) Continuation of application No. PCT/CN2018/099003, filed on Aug. 6, 2018.

(51) Int. Cl.
*G06K 9/00* (2006.01)
*G02B 7/182* (2021.01)

(52) U.S. Cl.
CPC ......... *G06K 9/00046* (2013.01); *G02B 7/182* (2013.01)

(58) Field of Classification Search
None
See application file for complete search history.

(56) References Cited

U.S. PATENT DOCUMENTS

2002/0131624 A1* 9/2002 Shapiro .............. G06K 9/00046
382/124
2018/0005005 A1 1/2018 He et al.

FOREIGN PATENT DOCUMENTS

CN 106462759 A 2/2017
CN 107004130 A 8/2017
(Continued)

OTHER PUBLICATIONS

Extended European Search Report for the corresponding EP patent application No. 18915797.7, dated May 29, 2020, 12 pages.
(Continued)

*Primary Examiner* — Nicholas J Lee (57) ABSTRACT

The present application relates to the field of biometric identification technologies, and provides an under-screen optical fingerprint identification device and an electronic apparatus with the under-screen optical fingerprint identification device. The under-screen optical fingerprint identification device comprises a reflecting component, a lens and a fingerprint sensor; the reflecting component, the lens and the fingerprint sensor are provided on a fingerprint detection light path of the under-screen optical fingerprint identification device; the lens is provided on a reflection path of the reflecting component, and is configured to converge fingerprint light reflected by the reflecting component to the fingerprint sensor; an incident angle of the fingerprint light on the display screen is greater than or equal to a preset angle, the fingerprint light being reflected by a finger to the display screen and entering the fingerprint sensor through the fingerprint detection light path.

20 Claims, 5 Drawing Sheets

(56) References Cited

FOREIGN PATENT DOCUMENTS

| CN | 207182338 U | 4/2018 |
|---|---|---|
| CN | 207182344 U | 4/2018 |
| CN | 207182353 U | 4/2018 |
| CN | 108009533 A | 5/2018 |
| WO | 2020019620 A1 | 1/2020 |

OTHER PUBLICATIONS

First Office Action for the corresponding CN patent application No. 201880001319.2, dated Jun. 30, 2021, 11 pages.
Zhipeng Li et al. "Optical fingerprint collection and processing," Physics Experimentation, vol. 37, Supp. Dec. 2017, 6 pages.

* cited by examiner

UNDER-SCREEN OPTICAL FINGERPRINT IDENTIFICATION DEVICE AND ELECTRONIC APPARATUS

CROSS REFERENCE TO RELATED APPLICATIONS

The present disclosure is a continuation of international application No. PCT/CN2018/099003 filed on Aug. 6, 2018, which is hereby incorporated by reference in its entirety.

TECHNICAL FIELD

The present application relates to the field of biometric identification technologies, and more particularly, to an under-screen optical fingerprint identification device and an electronic apparatus with the under-screen optical fingerprint identification device.

BACKGROUND

With the rapid development of manufacturing industry such as mobile phones, biometric identification technologies have attracted more and more attention from people, and a more convenient under-screen fingerprint identification technology has become popular. There are two main types of under-screen optical fingerprint identification technologies that have been disclosed. The first type is a periodic microporous array-based under-screen optical fingerprint identification technology, which has low imaging definition, and is susceptible to Moire fringe interference and more costly. The second type is a microlens-based under-screen optical fingerprint identification technology that has improved imaging definition and lower costs.

However, the inventor finds during the invention that, due to different conditions of fingers, for example, for some dry fingers with low humidity, the above-described microlens-based under-screen optical fingerprint identification technology also has a certain degree of imaging blur phenomenon.

SUMMARY

An object of some embodiments of the present application is to provide an under-screen optical fingerprint identification device and an electronic apparatus with the under-screen optical fingerprint identification device, which can further improve imaging definition.

Some embodiments of the present application provides an under-screen optical fingerprint identification device, comprising a reflecting component, a lens and a fingerprint sensor; the reflecting component, the lens and the fingerprint sensor are provided on a fingerprint detection light path of the under-screen optical fingerprint identification device; the lens is provided on a reflection path of the reflecting component, and is configured to converge fingerprint light reflected by the reflecting component to the fingerprint sensor; wherein, an incident angle of the fingerprint light on the display screen is greater than or equal to a preset angle, the fingerprint light being reflected by a finger to a display screen and entering the fingerprint sensor through the fingerprint detection light path.

Some embodiments of the present application further provides an electronic apparatus, comprising the under-screen optical fingerprint identification device as described above.

As compared with the existing art, in the embodiment of the present application, by designing the light path of the reflecting component, the lens and the fingerprint sensor, all the fingerprint light that enters the fingerprint sensor through the fingerprint detection light path to participate in imaging has incident angle on the display screen greater than or equal to the preset angle. The larger the incident angle of the fingerprint light on the display screen (hereinafter briefly referred to as an angle of the fingerprint light), the larger the difference in light intensity of the fingerprint light reflected from a fingerprint ridge-valley line surface of the finger; conversely, the smaller the angle of the fingerprint light, the smaller the difference in the light intensity of the fingerprint light reflected from the fingerprint ridge-valley line surface of the finger; and the difference in the light intensity affects imaging definition. Therefore, by the solution provided by the embodiment of the present application, the fingerprint light participating in imaging may all be large-angle fingerprint light, so that imaging definition may be improved. Moreover, a reflected light path is formed by the reflecting component, which is not only favorable for increasing a field of view, but is also favorable for thinning the apparatus with the under-screen optical fingerprint identification device.

In an embodiment, the reflecting component includes a mirror; the mirror is provided facing the display screen; and a light incident surface of the lens is provided perpendicular to the di splay screen.

In an embodiment, the mirror and the fingerprint sensor are both provided parallel to the di splay screen.

In an embodiment, at least one of the mirror and the fingerprint sensor has a preset tilt angle with respect to the display screen.

In an embodiment, the tilt angle of the mirror or the fingerprint sensor with respect to the display screen is between 0 degree and 30 degree.

In an embodiment, the tilt angle of the mirror with respect to the display screen is between 5 degree and 20 degree.

In an embodiment, the mirror and the fingerprint sensor are parallel to each other, and both have the preset tilt angle with respect to the display screen.

In an embodiment, the reflecting component includes a first mirror and a second mirror, the first mirror is provided facing the display screen, the second mirror is provided on a reflection path of the first mirror; and the lens is provided on a reflection path of the second mirror, and has a light incident surface thereof provided parallel to the display screen.

In an embodiment, at least one of the first mirror and the second mirror has a preset tilt angle with respect to the display screen.

In an embodiment, the first mirror and the second mirror are parallel to each other, and both have the preset tilt angle with respect to the display screen.

In an embodiment, the fingerprint sensor has a preset tilt angle with respect to the display screen.

In an embodiment, the reflecting component includes a mirror body; at least one surface of the mirror body forms a mirror; the reflecting component further includes a mounting portion provided on the mirror body, and the lens is fixed onto the mirror body through the mounting portion.

In an embodiment, the mirror body may include two inclined planes that are parallel to each other and have a certain tilt angle with respect to the display screen: one inclined plane is adjacent to a bottom surface of the mirror body and forms a first mirror, and the other inclined plane is adjacent to a top surface of the mirror body and forms a second mirror, wherein, the second mirror is located on a reflection path of the first mirror.

In an embodiment, the mirror body is formed with a notch on a reflection path of the second mirror; the notch has a mounting plane parallel to the display screen; and the mounting plane serves as the mounting portion for mounting the lens.

In an embodiment, the fingerprint sensor is accommodated inside the notch and is provided facing the lens; and a photosensitive surface of the fingerprint sensor is parallel to the mounting plane.

The lens includes a lens body and an aperture stop; the lens body includes a microlens or a microlens group composed of two or more microlenses; and the aperture stop is provided on a light incident surface of the lens body.

BRIEF DESCRIPTION OF THE DRAWINGS

One or more embodiments are exemplarily explained through the diagrams in the accompanying drawings corresponding thereto, these exemplary explanations do not constitute a limitation to the embodiments, elements having same reference signs are denoted as similar elements; and the diagrams in the accompanying drawings do not constitute a scale limitation unless otherwise specified.

DETAILED DESCRIPTION

In order to make objects, technical solutions and advantages of the embodiments of the present application more apparent, some embodiments of the present application will be further explained in detail below in conjunction with the drawings and the detailed description. It should be understood that the specific embodiments described here are merely used for explaining the present application, and not intended to limit the present application.

The first embodiment of the present application relates to an under-screen optical fingerprint identification device, the under-screen optical fingerprint identification device may be provided under a display screen (for example, a touch display screen), and comprises: a reflecting component, a lens and a fingerprint sensor. When a finger presses against the display screen, excitation light emitted by a light source (for example, light emitted by a display unit of the display screen or by an infrared light source under the display screen) is reflected on a surface of the finger and forms fingerprint light returning to the display screen. An incident angle of the fingerprint light on the display screen is greater than or equal to a first preset angle, the reflecting component reflects the fingerprint light passing through the display screen to the lens, and the lens converges the fingerprint light to the fingerprint sensor.

In this embodiment, an optical path of the fingerprint light reflected by the finger to the display screen that is transmitted to the fingerprint sensor through the reflecting component and the lens may be defined as a fingerprint detection light path, and the incident angle of the fingerprint light on the display screen is greater than or equal to the first preset angle so as to form large-angle light. The fingerprint light with large-angle can enter the fingerprint sensor through the fingerprint detection light path, and fingerprint light with an incident angle smaller than the first preset angle (hereinafter also referred to as small-angle light) is not allowed to enter the fingerprint sensor through the fingerprint detection light path, so that the fingerprint light participating in imaging is all large-angle light, and imaging definition may be further improved. Moreover, a reflected light path is formed by the reflecting component, which is not only favorable for increasing a field of view, but is also favorable for thinning the apparatus with the under-screen optical fingerprint identification device.

When the fingerprint detection light path is implemented, a specific fingerprint detection light path may be designed through comprehensive consideration of relative positions and relative distances among the display screen, the reflecting component and the lens, as well as influencing factors such as a refractive index and a thickness of a light propagation medium in the fingerprint detection light path, and thus, the fingerprint detection light path is implemented such that what participates in imaging is all large-angle light. In actual application, there may be various specific structures of the under-screen optical fingerprint identification device for implementing the fingerprint detection light path, and some preferable embodiments are mainly exemplarily explained in this embodiment.

Figure 1:
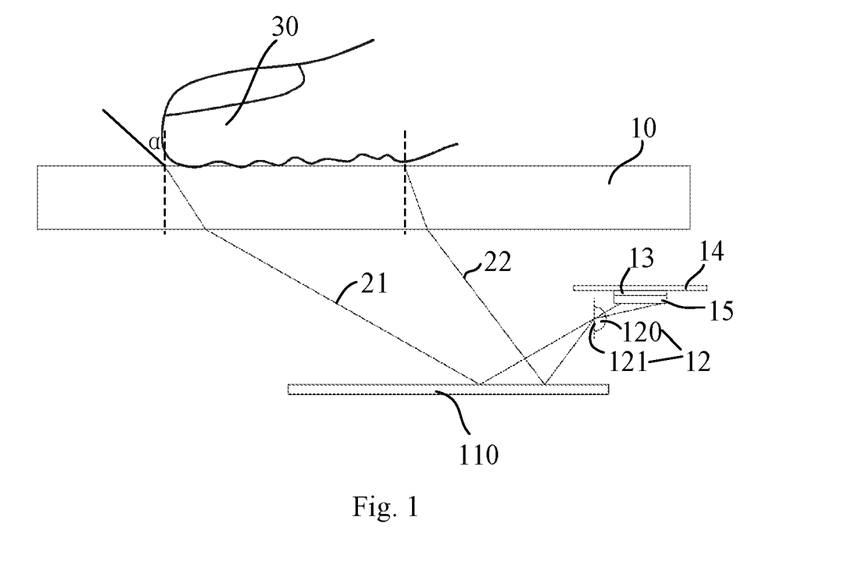
FIG. 1 is a structural schematic diagram of an under-screen optical fingerprint identification device having one mirror, and having the mirror and a fingerprint sensor both parallel to a display screen according to a first embodiment of the present application.

Referring to FIG. 1, an angle of fingerprint light may be represented by an incident angle α of the fingerprint light on a touch display screen 10, and the angle of the fingerprint light affects a difference in light intensity of the fingerprint light reflected from a fingerprint ridge-valley line surface of a finger 30. Imaging blur of a fingerprint image may be resulted from a very small difference in the light intensity. Therefore, imaging definition may be improved by reducing participation of small-angle light in imaging of the fingerprint image. In this embodiment, the incident angle of the fingerprint light is designed to be greater than or equal to the first preset angle. The first preset angle may be obtained according to required imaging definition; generally, the larger the first preset angle, the higher the imaging definition; and conversely, the smaller the first preset angle, the more blurred the imaging. In actual application, the first preset angle may have a value within a range of greater than or equal to 20 degree and less than or equal to 30 degree, which is not limited thereto.

Referring to FIG. 1 to FIG. 9, a lens 12 includes a lens body 120 and an aperture stop 121. The lens body 120 may include a microlens or a microlens group composed of two or more microlenses. The aperture stop 121 is provided on a light incident surface of the lens body 120. After reflected by a reflecting component 110, the fingerprint light participating in imaging firstly enters the lens body 120 through the aperture stop 121, and then enters a fingerprint sensor 13 through the lens body 120. In actual application, the under-screen optical fingerprint identification device may further comprise a filter 15. The filter 15 may be provided in a photosensitive region of the fingerprint sensor 13; and the filter 15 may filter out, for example, red light or infrared light. The fingerprint sensor 13 may be mounted into an electronic apparatus through a carrier of a sensor substrate 14 or the like. A specific implementation manner of the fingerprint sensor 13, the filter 15 and the sensor substrate 14 will not be limited in this embodiment.

The reflecting component may include one mirror or a plurality of mirrors. In some examples, the number of mirrors may be an odd number, and referring to FIG. 1 to FIG. 4, the number of mirrors 110 is, for example, one. In some examples, the number of mirrors may be an even number, and referring to FIG. 5 to FIG. 9, the number of mirrors 110 is, for example, two, but is not limited thereto. When the fingerprint detection light path is implemented, when the number of mirrors 110 is an odd number, a light incident surface of the lens 12 and an operation surface (i.e., a touch surface) of a display screen 10 may be provided perpendicular to each other; and when the number of mirrors 110 is an even number, the light incident surface of the lens 12 and the operation surface of the display screen 10 may be provided parallel to each other.

The lens 12 according to this embodiment is a microlens with a diameter usually on a millimeter scale, so it is relatively difficult to have the lens 12 assembled into the electronic apparatus; however, the light incident surface of the lens 12 is provided perpendicular or parallel to the operation surface of the display screen 10, which, as compared with a case where the light incident surface of the lens 12 is tilted with respect to the operation surface of the display screen 10, is favorable for reducing the assembly difficulty of the lens. In this embodiment, a relative position between the lens 12 and the display screen 10 will not be specifically limited, and the lens 12 may also be tilted with respect to the display screen 10.

Figure 2:
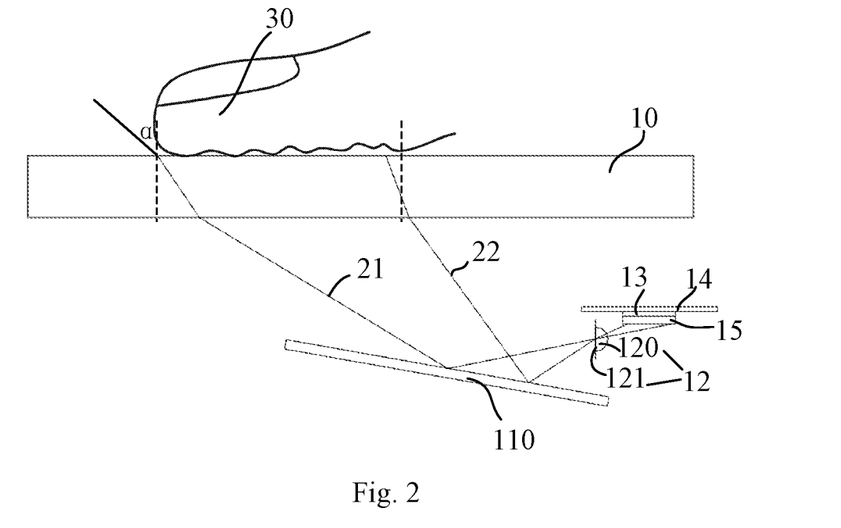
FIG. 2 is a structural schematic diagram of the under-screen optical fingerprint identification device having one mirror, and having the mirror tilted with respect to the display screen according to the first embodiment of the present application.
Figure 3:
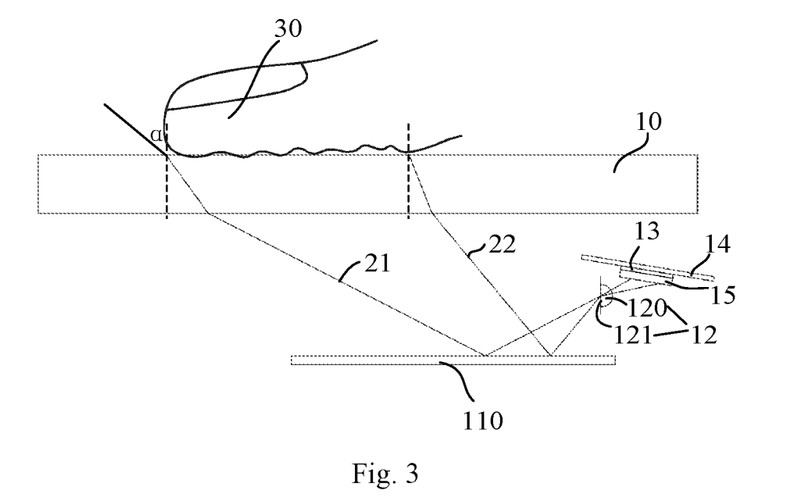
FIG. 3 is a structural schematic diagram of the under-screen optical fingerprint identification device having one mirror, and having the fingerprint sensor tilted with respect to the display screen according to the first embodiment of the present application.
Figure 4:
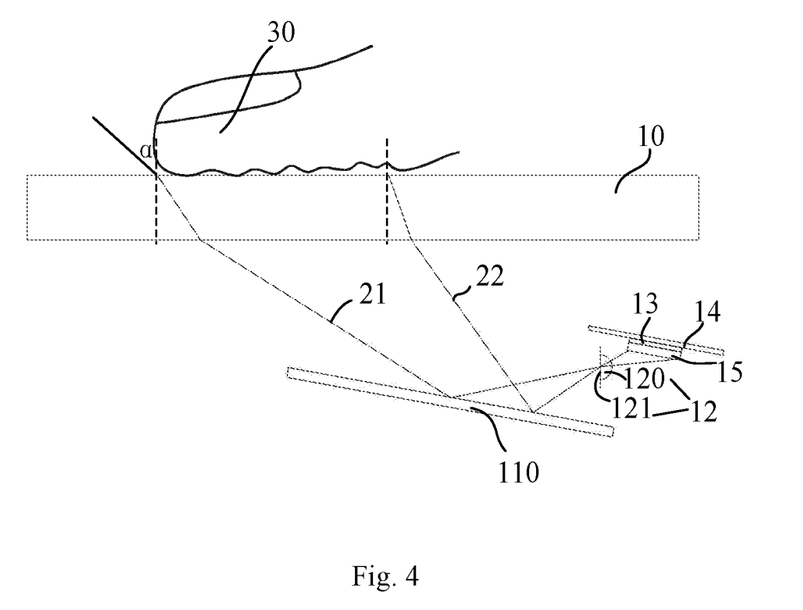
FIG. 4 is a structural schematic diagram of the under-screen optical fingerprint identification device having one mirror, and having the mirror and the fingerprint sensor both tilted with respect to the display screen according to the first embodiment of the present application.

When the lens 12 and the display screen 10 are provided perpendicular or parallel to each other in the above-described manners, the mirror 110 may be provided parallel to the display screen 10 (as shown in FIG. 1 or FIG. 3), or the mirror 110 may be tilted with respect to the display screen 10 (as shown in FIG. 2 or FIG. 4), and a tilt angle between the two is greater than 0 degree and less than or equal to 30 degree. In this case, when the mirror 110 is provided at a relatively small tilt angle with respect to the display screen 10, it is favorable for avoiding small-angle fingerprint light from entering the fingerprint light path.

In some examples, when the lens 12 and the display screen 10 are provided perpendicular or parallel to each other, the tilt angle between the mirror 110 and the display screen 10 may be an angle greater than or equal to 5 degree and less than or equal to 20 degree, so as to facilitate controlling, by the fingerprint detection light path, fingerprint light to participate in imaging with a better angle, for example, the incident angle of the fingerprint light participating in imaging has a value within an angle range of greater than or equal to 30 degree and less than or equal to 75 degree, but it is not limited thereto. This can not only ensure imaging definition, but also avoid imaging distortion caused by participation of the fingerprint light with an excessively large angle in imaging.

In some examples, factors such as a relative position and a relative distance between the lens 12 and the fingerprint sensor 13 may also affect participation of the fingerprint light in imaging of the fingerprint image. Therefore, in this embodiment, by selecting an appropriate relative position or relative distance between the lens 12 and the fingerprint sensor 13, the fingerprint light converged by the lens 12 to the fingerprint sensor 13 may be controlled to be the fingerprint light having the incident angle on the display screen 10 greater than or equal to a second preset angle, herein, the second preset angle is greater than the first preset angle. That is, by designing the light path between the lens 12 and the fingerprint sensor 13, fingerprint light with a larger incident angle can participate in imaging. In some examples, when the lens 12 and the display screen 10 are provided perpendicular or parallel to each other, a photosensitive surface of the fingerprint sensor 13 may be provided parallel to the display screen 10, or the photosensitive surface of the fingerprint sensor 13 may be provided at a predetermined tilt angle with respect to the display screen 10, and the predetermined tilt angle is greater than 0 degree and less than or equal to 30 degree.

Referring to FIG. 1, in the embodiment shown in FIG. 1, the under-screen optical fingerprint identification device comprises one mirror 110; the mirror 110 and the photosensitive surface of the fingerprint sensor 13 are both provided parallel to the display screen 10. The mirror 110 is not provided directly below a fingerprint sensing region of the display screen 10, but is offset from a vertical projection of the fingerprint sensing region of the display screen 10 (for example, a region where the finger 30 is located) by a certain distance. The lens 12 is provided perpendicular to the display screen 10 and the mirror 110, and is located on a reflection path of the mirror 110. There is a certain distance between the lens 12 and the mirror 110, so that the fingerprint light, after being reflected by the mirror 110, can be transmitted to the lens 12 and enter the aperture stop 121 thereof. The fingerprint sensor 13 and the display screen 10 are provided parallel to each other and have a certain distance therebetween, the photosensitive surface of the fingerprint sensor 13 may face a reflecting surface of the mirror 110 and face away from a display surface of the display screen 10. A distance between the fingerprint sensor 13 and the lens 12 may cause the fingerprint light to be converged to the photosensitive surface of the fingerprint sensor 13 through the lens 120.

It can be seen from propagation paths of first fingerprint light 21 and second fingerprint light 22 at a boundary of the finger 30 that enter the fingerprint sensor 13 in FIG. 1 that, it is assumed that the second fingerprint light 22 corresponds to the first preset angle, then fingerprint light with an incident angle smaller than that of the second fingerprint light 22 cannot be reflected by the mirror 110 and converged by the lens 120 to enter the fingerprint sensor 13. Therefore, the fingerprint identification device according to this embodiment can not only satisfy requirements of imaging by large-angle fingerprint light, but also reduce difficulties in light path design and device assembly.

Referring to FIG. 2, the embodiment shown in FIG. 2 differs from the under-screen optical fingerprint identification device shown in FIG. 1 in that, the mirror 110 is tilted with respect to the display screen 10, and a tilt angle between the two is preferably smaller than 30 degree, for example, an end of the mirror 110 that is away from the lens 12 is rotated clockwise by an angle within 30 degree, so as to have the above-described tilt angle of less than 30 degree with respect to the display screen 10. Because the lens 12 is perpendicular to the display screen 10, the rotated mirror 110 may also have a certain tilt angle with respect to the lens 12. As compared with the solution in which the mirror 110 and the display screen 10 are provided parallel to each other, the tilt angle of the mirror 110 with respect to the display screen 10 can reduce the incident angle of the fingerprint light reflected by the mirror 110 on the light incident surface of the lens 12. The larger the tilt angle, the smaller the incident angle of the fingerprint light on the lens 12. The tilt angle of the mirror 110 needs to be controlled within a certain range to avoid the incident angle of the fingerprint light on the lens 12 from being reduced to a certain extent such that the fingerprint light cannot enter the lens body 120 through the aperture stop 121 and thus cannot participate in imaging. On the other hand, the tilt angle of the mirror 110 can reduce the incident angle of the fingerprint light on the lens 12, thus, by selecting an appropriate tilt angle of the mirror 110 with respect to the touch display screen 10, fingerprint light with an excessively large incident angle on the lens 12 can be prevented from entering the lens 12, so as to avoid image distortion caused by participation of the above-described fingerprint light with an excessively large incident angle in imaging.

Referring to FIG. 3, the embodiment shown in FIG. 3 differs from the under-screen optical fingerprint identification device shown in FIG. 1 in that, the fingerprint sensor 13 is tilted with respect to the display screen 10, and a tilt angle between the two is preferably within 30 degree, for example, an end of the fingerprint sensor 13 that is away from the lens 12 is rotated clockwise by an angle within 30 degree. In this way, as the tilt angle of the fingerprint sensor 13 with respect to the display screen 10 increases, the fingerprint light with an excessively large incident angle on the display screen 10 cannot enter an effective photosensitive region of the fingerprint sensor 13 after passing through the fingerprint detection light path and thus cannot participate in imaging. Therefore, by selecting an appropriate tilt angle of the fingerprint sensor 13 with respect to the touch display screen 10, the fingerprint light with an excessively large angle can be prevented from entering the fingerprint sensor 13, so as to avoid image distortion caused by participation of the fingerprint light with an excessively large angle in imaging.

Further referring to FIG. 4, the embodiment shown in FIG. 4 differs from the under-screen optical fingerprint identification device shown in FIG. 1 in that, the mirror 110 and the fingerprint sensor 13 are both tilted with respect to the display screen 10. As an alternative implementation solution, the mirror 110 and the photosensitive surface of the fingerprint sensor 13 may be provided parallel to each other, or the two may also have a relative small tilt angle therebetween. Therefore, as compared with the case where only the mirror 110 or the fingerprint sensor 13 is tilted with respect to the touch display screen 10 in FIG. 2 or FIG. 3, it may better avoid image distortion caused by participation of the fingerprint light with an excessively large angle in imaging.

Figure 5:
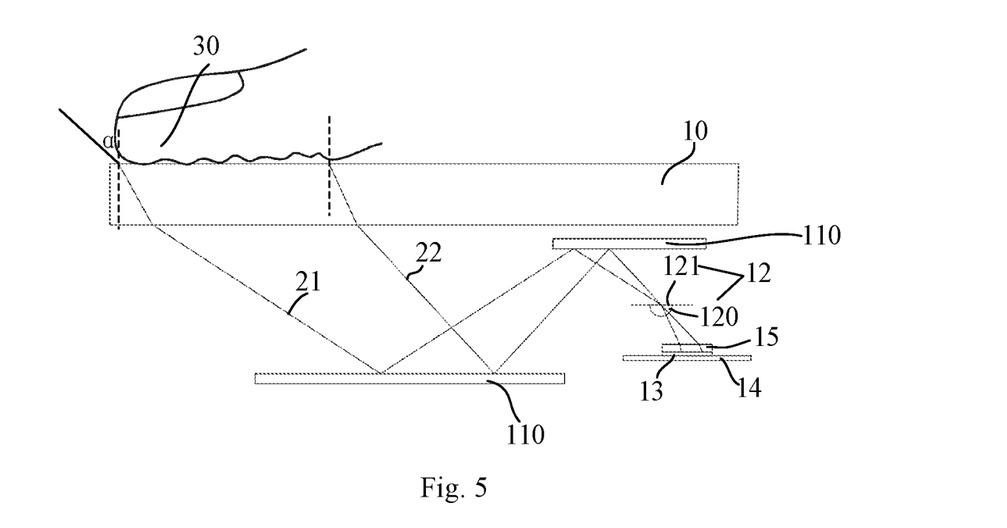
FIG. 5 is a structural schematic diagram of the under-screen optical fingerprint identification device having two mirrors and the fingerprint sensor all provided parallel to the display screen according to the first embodiment of the present application.

Referring to FIG. 5, in the embodiment shown in FIG. 5, the reflecting component of the under-screen optical fingerprint identification device includes two mirrors 110, such that the fingerprint light performs two reflections in a propagation process in the fingerprint detection light path. In a specific embodiment, the two mirrors 110 may be both provided parallel to the display screen 10, a reflecting surface of a first mirror 110 faces a bottom surface of the display screen 10 to receive the fingerprint light passing through the display screen 10, and a second mirror 110 is provided on a reflection path of the first mirror and has a reflecting surface facing the reflecting surface of the first mirror 110. The lens 12 is provided on a reflection path of a second reflection; the lens 12 is provided parallel to the touch display screen; and the fingerprint sensor 13 is provided parallel to the display screen 10. Based on the above-described structure, the fingerprint light, after a reflection by the first mirror 110, can enter the lens 12 after a second reflection by the second mirror 110; and the lens 12 can further converge the fingerprint light to the fingerprint sensor 13. In this way, it can be ensured that the fingerprint light participating in imaging is all large-angle fingerprint light, and moreover, the two reflections can not only further increase a field of view, but also facilitate thinning of the device.

Figure 6:
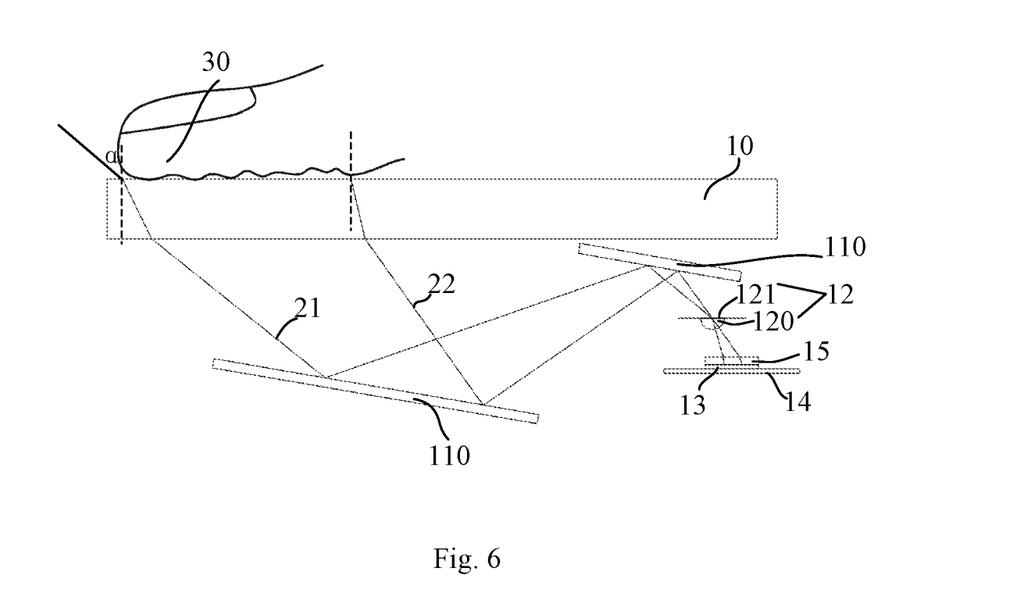
FIG. 6 is a structural schematic diagram of the under-screen optical fingerprint identification device having the two mirrors both tilted with respect to the display screen according to the first embodiment of the present application.

Further referring to FIG. 6, the embodiment shown in FIG. 6 differs from the under-screen optical fingerprint identification device shown in FIG. 5 in that, the two mirrors 110 are parallel to each other and both are tilted with respect to the display screen 10. A tilt angle of the two mirrors 110 with respect to the touch display screen 10 is preferably within 30 degree. For example, an end of each of the mirrors 110 that is close to the lens 12 is rotated clockwise by an angle within 30 degree. In this way, the tilt angle of the two mirrors 110 with respect to the display screen 10 can reduce the incident angle of the fingerprint light reflected by the two mirrors 110 on the light incident surface of the lens 12. The larger the tilt angle, the smaller the incident angle of the fingerprint light on the lens 12. The tilt angle of the two mirrors 110 needs to be controlled within a certain range, to avoid the incident angle of the fingerprint light on the lens 12 from being reduced to a certain extent such that the fingerprint light cannot enter the lens body 120 through the aperture stop 121 and thus cannot participate in imaging. On the other hand, by selecting an appropriate tilt angle of the two mirrors 110 with respect to the display screen 10, the fingerprint light with an excessively large incident angle on the lens 12 can be prevented from entering the lens 12, so as to avoid image distortion caused by participation of the above-described fingerprint light with an excessively large angle in imaging.

Figure 7:
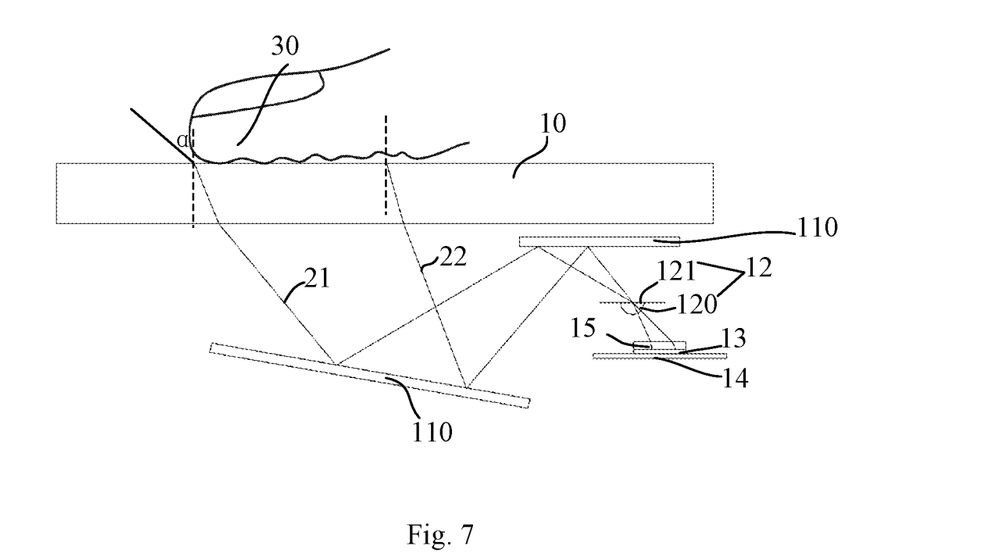
FIG. 7 and FIG. 8 are structural schematic diagrams of the under-screen optical fingerprint identification device having one of the two mirrors tilted with respect to the display screen according to the first embodiment of the present application.
Figure 8:
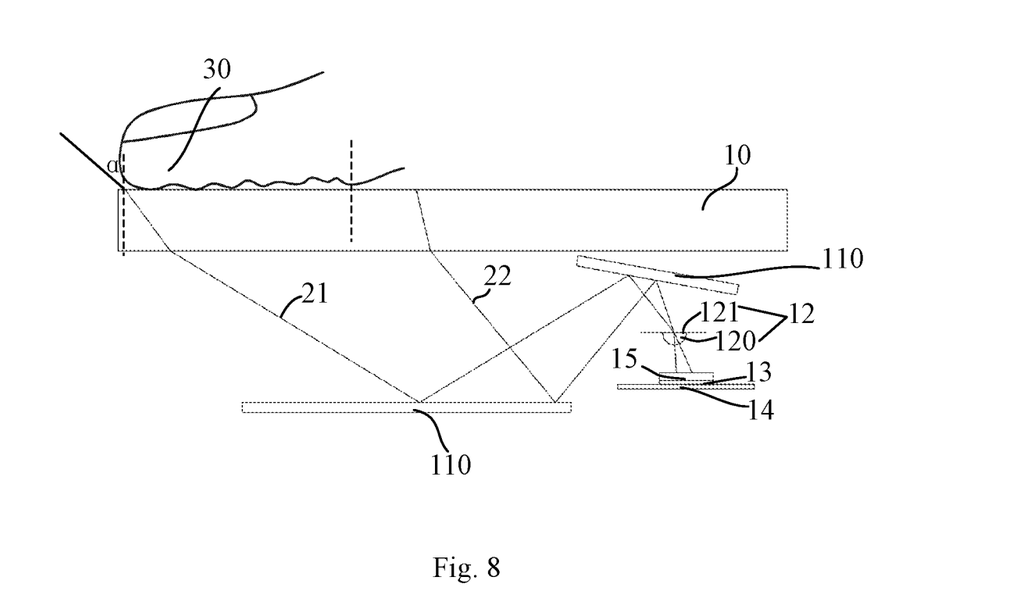

Further referring to FIG. 7 and FIG. 8, the embodiments shown in FIG. 7 and FIG. 8 differ from the under-screen optical fingerprint identification device shown in FIG. 5 in that, one of the two mirrors 110 is tilted with respect to the display screen 10. Specifically, in the embodiment shown in FIG. 7, the first mirror 110 is tilted with respect to the display screen 10, while the second mirror 110 still remains parallel to the display screen 10. In the embodiment shown in FIG. 8, the first mirror 110 still remains parallel to the display screen 10, while the second mirror 110 has a certain tilt angle with respect to the display screen 10. Similarly, by selecting an appropriate tilt angle of one of the mirrors 110 with respect to the display screen 10, the fingerprint light with an excessively large incident angle on the lens 12 can be prevented from entering the lens 12, so as to avoid image distortion caused by participation of the fingerprint light with an excessively large angle in imaging.

Figure 9:
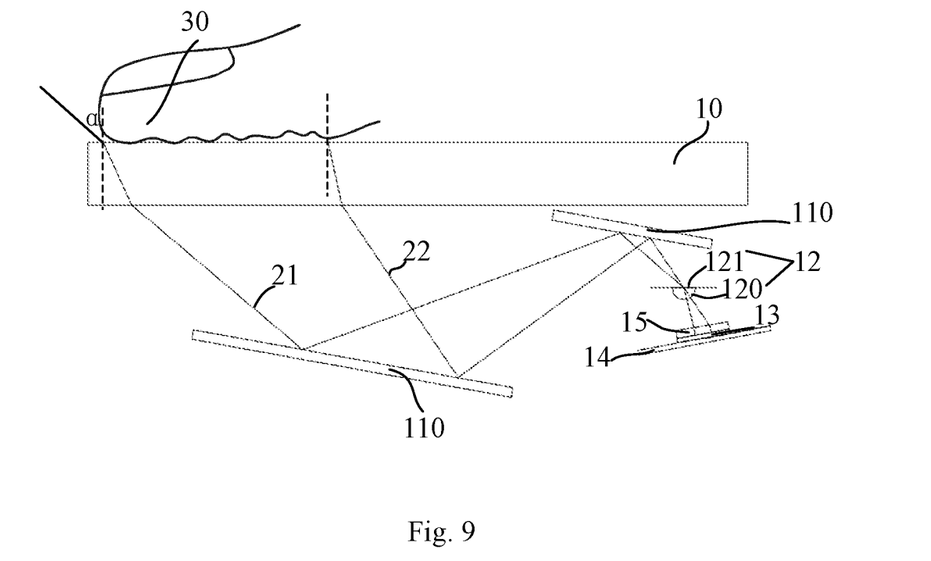
FIG. 9 is a structural schematic diagram of the under-screen optical fingerprint identification device having the two mirrors and the fingerprint sensor all tilted with respect to the display screen according to the first embodiment of the present application.

Further referring to FIG. 9, the embodiment shown in FIG. 9 differs from the under-screen optical fingerprint identification device shown in FIG. 6 in that, the fingerprint sensor 13 is also tilted with respect to the display screen 10, and a tilt angle between the two is preferably less than 30 degree. In addition, a tilt direction of the photosensitive surface of the fingerprint sensor 13 is opposite to a tilt direction of the two mirrors 110. For example, an end of the fingerprint sensor 13 that is away from the fingerprint sensing region of the display screen 10 is rotated counter-clockwise by an angle within 30 degree. In this way, due to the tilt angle of the fingerprint sensor 13 with respect to the touch display screen 10, the fingerprint light with an excessively large angle cannot enter the effective photosensitive region of the fingerprint sensor 13 and thus cannot participate in imaging. Therefore, by selecting an appropriate tilt angle of the fingerprint sensor 13 with respect to the display screen 10, the fingerprint light with an excessively large angle can be prevented from entering the fingerprint sensor 13, so as to avoid image distortion caused by participation of the fingerprint light with an excessively large angle in imaging.

It should be noted that, in actual application, the reflecting component, the lens and the fingerprint sensor may all be mounted in the electronic apparatus through structural member, and no details will be repeated here.

As compared with the existing art, in this embodiment, by designing the light path formed by the display screen, the reflecting component, the lens and the fingerprint sensor, the fingerprint light passes through the light path to participate in imaging may all be large-angle light, so that imaging definition may be improved; moreover, the fingerprint light is reflected by the reflecting component, which can not only increase a field of view, but also reduce a thickness of the fingerprint identification device, which is favorable for thinning the electronic apparatus.

The second embodiment of the present application relates to an under-screen optical fingerprint identification device. Improvements are made in the second embodiment based on the first embodiment, and a main improvement is that, in the second embodiment, there is provided a reflecting component structure which is easy to implement and easy to assemble.

Figure 10:
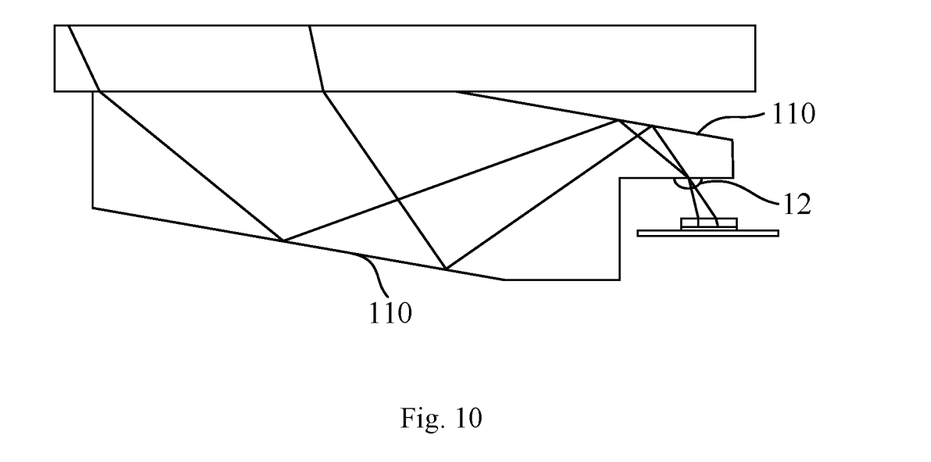
FIG. 10 is a structural schematic diagram of an under-screen optical fingerprint identification device according to a second embodiment of the present application.

Referring to FIG. 10, in this embodiment, the reflecting component includes a mirror body and at least one surface of the mirror body forms a mirror 110; the reflecting component further includes a mounting portion formed on the mirror body, and a lens 12 is fixed onto the mirror body through the mounting portion.

The mirror body is made of, for example, glass. The mirror body may have one or more reflecting planes, and the one or more mirrors 110 may be obtained by spraying an optical coating on the one or more reflecting planes. For example, in the embodiment shown in FIG. 10, the mirror body may include two inclined planes that are parallel to each other and have a certain tilt angle with respect to a display screen; one inclined plane is adjacent to a bottom surface of the mirror body and forms a first mirror, and the other inclined plane is adjacent to a top surface of the mirror body and forms a second mirror. The second mirror is located on a reflection path of the first mirror; the mirror body may be formed with a notch on a reflection path of the second mirror. The notch has a mounting plane parallel to the display screen, and the mounting plane may serve as the mounting portion for mounting the lens 12. In addition, the fingerprint sensor may be accommodated inside the notch and is provided facing the lens 12, but it is not limited thereto.

As compared with the foregoing embodiments, in this embodiment, by designing the mirror body having a plurality of planes, not only one mirror or a plurality of parallel or non-parallel mirrors can be conveniently processed, but also the lens can be directly fixed onto the mirror body, so as to greatly reduce an assembly difficulty of the lens.

A third embodiment of the present application relates to an electronic apparatus, comprising the under-screen optical fingerprint identification device as described in the first embodiment or the second embodiment. The electronic apparatus is, for example, a smartphone, a tablet personal computer, and the like, but is not limited thereto.

As compared with the existing art, in this embodiment, by designing the light path formed by the display screen, the reflecting component, the lens and the fingerprint sensor, the fingerprint light passing through the light path to participate in imaging may all be large-angle light, so that imaging definition may be improved; moreover, the fingerprint light is reflected by the reflecting component, which can not only increase a field of view, but also reduce a thickness of the fingerprint identification device, which is favorable for thinning the electronic apparatus.

Those ordinarily skilled in the art may understand that, the above-described respective embodiments are specific embodiments for implementing the present application, and in actual application, various changes can be made in forms and details without departing from the spirit and scope of the present application.

What is claimed is:

1. An under-screen optical fingerprint identification device, applied under a display screen of an electronic apparatus, wherein, the under-screen optical fingerprint identification device comprises: a reflecting component, a lens and a fingerprint sensor;
    the reflecting component, the lens and the fingerprint sensor are provided on a fingerprint detection light path of the under-screen optical fingerprint identification device;
    the lens is provided on a reflection path of the reflecting component, and is configured to converge fingerprint light reflected by the reflecting component to the fingerprint sensor;
    wherein, an incident angle of the fingerprint light on the display screen is greater than or equal to a preset angle, the fingerprint light being reflected by a finger to the display screen and entering the fingerprint sensor through the fingerprint detection light path; and
    wherein the reflecting component comprises a first mirror and a second mirror, the first mirror is provided facing the display screen, the second mirror is provided on a reflection path of the first mirror; and the lens is provided on a reflection path of the second mirror and has a light incident surface provided parallel to the display screen.

2. The under-screen optical fingerprint identification device according to claim 1, wherein, at least one of the first mirror and the second mirror has a preset tilt angle with respect to the display screen.

3. The under-screen optical fingerprint identification device according to claim 1, wherein, the first mirror and the second mirror are parallel to each other, and both have a first preset tilt angle with respect to the display screen.

4. The under-screen optical fingerprint identification device according to claim 3, wherein, the fingerprint sensor has a second preset tilt angle with respect to the display screen.

5. The under-screen optical fingerprint identification device according to claim 1, wherein, the reflecting component comprises a mirror body;
   at least one surface of the mirror body forms one of the first mirror and the second mirror;
   the reflecting component further comprises a mounting portion provided on the mirror body, and the lens is fixed onto the mirror body through the mounting portion.

6. The under-screen optical fingerprint identification device according to claim 5, wherein, the mirror body comprises two inclined planes that are parallel to each other and have a certain tilt angle with respect to the display screen: one inclined plane is adjacent to a bottom surface of the mirror body and forms the first mirror, and the other inclined plane is adjacent to a top surface of the mirror body and forms the second mirror, wherein, the second mirror is located on a reflection path of the first mirror.

7. The under-screen optical fingerprint identification device according to claim 6, wherein, the mirror body is formed with a notch on a reflection path of the second mirror; the notch has a mounting plane parallel to the display screen; and the mounting plane serves as the mounting portion for mounting the lens.

8. The under-screen optical fingerprint identification device according to claim 7, wherein, the fingerprint sensor is accommodated inside the notch and is provided facing the lens; and a photosensitive surface of the fingerprint sensor is parallel to the mounting plane.

9. The under-screen optical fingerprint identification device according to claim 1, wherein, the lens comprises a lens body and an aperture stop; the lens body comprises a microlens or a microlens group composed of at least two microlenses; and the aperture stop is provided on a light incident surface of the lens body.

10. The under-screen optical fingerprint identification device according to claim 1, wherein, the preset angle is within a range of greater than or equal to 20 degree and less than or equal to 30 degree.

11. An electronic apparatus, characterized by comprising: an under-screen optical fingerprint identification device applied under a display screen of the electronic apparatus, wherein, the under-screen optical fingerprint identification device comprises: a reflecting component, a lens and a fingerprint sensor;
   the reflecting component, the lens and the fingerprint sensor are provided on a fingerprint detection light path of the under-screen optical fingerprint identification device;
   the lens is provided on a reflection path of the reflecting component, and is configured to converge fingerprint light reflected by the reflecting component to the fingerprint sensor;
   wherein, an incident angle of the fingerprint light on the display screen is greater than or equal to a preset angle, the fingerprint light being reflected by a finger to the display screen and entering the fingerprint sensor through the fingerprint detection light path; and
   wherein the reflecting component comprises a first mirror and a second mirror, the first mirror is provided facing the display screen, the second mirror is provided on a reflection path of the first mirror; and the lens is provided on a reflection path of the second mirror and has a light incident surface provided parallel to the display screen.

12. The under-screen optical fingerprint identification device according to claim 1, wherein one of the first mirror and the second mirror is provided facing the display screen, and a light incident surface of the lens is provided perpendicular to the display screen.

13. The under-screen optical fingerprint identification device according to claim 1, wherein the first mirror, the second mirror and the fingerprint sensor are provided parallel to the display screen.

14. The under-screen optical fingerprint identification device according to claim 4, wherein the first tilt angle and the second title angle are in a range between 0 degree and 30 degree, and a tilt direction of first tilt angle is opposite to a tilt direction of second title angle.

15. An under-screen optical fingerprint identification device, applied under a display screen of an electronic apparatus, wherein, the under-screen optical fingerprint identification device comprises: a reflecting component, a lens and a fingerprint sensor;
   the reflecting component, the lens and the fingerprint sensor are provided on a fingerprint detection light path of the under-screen optical fingerprint identification device;
   the lens is provided on a reflection path of the reflecting component, and is configured to converge fingerprint light reflected by the reflecting component to the fingerprint sensor;
   wherein all the fingerprint light being reflected by a finger to the display screen and entering the fingerprint sensor through the fingerprint detection light path has incident angle on the display screen greater than or equal to a preset angle, and the preset angle is within a range of greater than or equal to 20 degree and less than or equal to 30 degree.

16. The under-screen optical fingerprint identification device according to claim 15, wherein the reflecting component comprises a mirror, the mirror is provided facing the display screen, and a light incident surface of the lens is provided perpendicular to the display screen.

17. The under-screen optical fingerprint identification device according to claim 16, wherein the mirror and the fingerprint sensor are both provided parallel to the display screen.

18. The under-screen optical fingerprint identification device according to claim 16, wherein at least one of the mirror and the fingerprint sensor has a preset tilt angle with respect to the display screen.

19. The under-screen optical fingerprint identification device according to claim 18, wherein the tilt angle of the mirror or the fingerprint sensor with respect to the display screen is between 0 degree and 30 degree.

20. The under-screen optical fingerprint identification device according to claim 18, wherein the mirror and the fingerprint sensor are parallel to each other, and both have the preset tilt angle with respect to the display screen.

* * * * *